June 15, 1954 — C. E. WORDEN — 2,681,065
CYLINDER ADJUSTING DEVICE
Filed Dec. 8, 1949 — 2 Sheets-Sheet 1
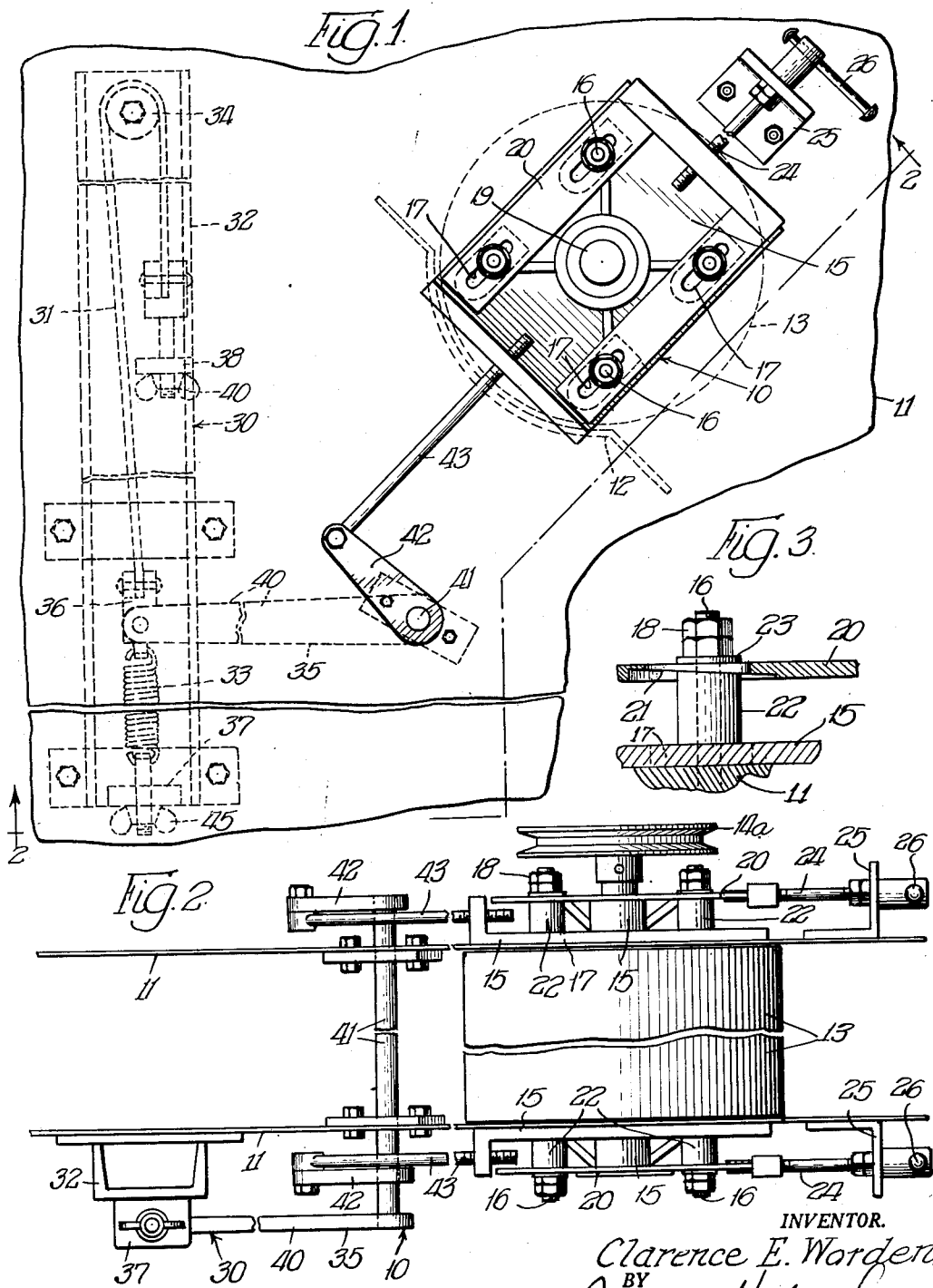
INVENTOR.
Clarence E. Worden,
BY June 15, 1954  C. E. WORDEN  2,681,065
CYLINDER ADJUSTING DEVICE Filed Dec. 8, 1949  2 Sheets-Sheet 2

INVENTOR.
Clarence E. Worden,
BY

Patented June 15, 1954

2,681,065

UNITED STATES PATENT OFFICE 2,681,065

CYLINDER ADJUSTING DEVICE

Clarence E. Worden, Peoria, Ill.

Application December 8, 1949, Serial No. 131,895

11 Claims. (Cl. 130—27)

This invention relates generally to agricultural implements and more particularly to those implements such as threshing machines and combines having crop treating cylinders and concaves.

Agricultural machines such as combines and threshers are usually provided with a rotary cylinder which is mounted for rotation in close proximity to a stationary curved plate or concave. Reaped grain or other crop material is fed between the rotating cylinder and the concave and is scuffed or threshed by the relative action between the cylinder and concave to remove or hull the grain from the chaff. The chaff is then carried from the grain usually by means of a blast of air. The blast of air preferably used is just strong enough to carry away the relatively light chaff, but not strong enough to carry the naked grain kernels.

For efficient threshing it is particularly important that the clearance or spacing between the stationary concave and the rotary cylinder be properly adjusted because if adjusted too wide unhulled grain is left in the straw and thereby wasted, whereas if adjusted too narrow the kernels are broken and blown away with the chaff, or if saved are not acceptable to the trade. This optimum spacing, however, is a variable characteristic depending on the size of the grain and its moisture content, among other things. The size of the grain, of course, is a more or less constant factor with each field being harvested, and, if the proper spacing depended on size alone, it would be relatively simple to adjust the spacing for the average grain size, and thresh the whole crop in any particular field with one adjustment.

Moisture content on the other hand is not so simple. It is important and presents many problems. The moisture content of a standing crop of grain ready for threshing varies with the humidity of the air throughout each day of threshing and from day to day. Moisture content also involves a time lag during which moisture must work into and out of the grain with changes in humidity. Moisture content is important because it has been found that the more moist the grain is, the closer the cylinder must be set to the concave, and conversely, the drier the grain, the more the clearance should be, because dry hulls will crack with slight pressure while moist hulls must be torn or shredded away from the inner kernel with a heavier scuffing action.

Moreover, merely setting the clearance for a moist grain is not a satisfactory solution either, because if the grain is drier the individual kernels are more brittle and are cracked during the process, with the result that they spoil readily and in turn cause deterioration of other kernels. Thus it is necessary in good threshing practice to vary continually the cylinder-concave clearance many times during the day to compensate for humidity changes, and as often as every hour check the clearance.

The practice heretofore has been for the operator to observe the threshed grain from time to time and alter the clearance whenever the hulls are not completely removed or the kernels are cracked. This, however, is an empirical cut and try wasteful procedure which cannot be successfully accomplished except by a skilled operator occupied with that task the entire day.

Another difficulty involved is that the cylinder adjustment has been mechanically difficult to accomplish for the bearing plates which support the ends of the cylinder are of necessity quite inaccessible and difficult to loosen and reposition. This difficulty arises due to the inherent construction of threshers and combines required for them to function and stand up for long periods of operation. In fact, the bearing plates must bear high thrust loads without movement under heavy vibration both from applied power and movements in the field.

A principal object of this invention is to provide a bearing plate assembly which will permit easy adjustment of the clearance with a minimum of effort or skill required of the operator.

A second object is to provide an automatic compensating device which is responsive to the moisture in the air and to changes of the moisture content of the air with a proper time lag so as to anticipate changes in the moisture content of the grain and correctly and continuously maintain the proper cylinder clearance at all times.

Another object is to provide an adjustment arrangement wherein the cylinder is firmly supported against lateral movement during threshing and yet is freely movable for compensating movement.

Other objects and advantages of this invention will of course present themselves to those familiar with the art on reading the following specification in conjunction with the drawings and the appended claims.

In the drawings—

Fig. 1 is a side view of a preferred embodiment of my cylinder adjusting device;

Fig. 2 is a bottom view;

Fig. 3 is an enlarged view partly in section showing the plate lock and release arrangement;

Figure 4:
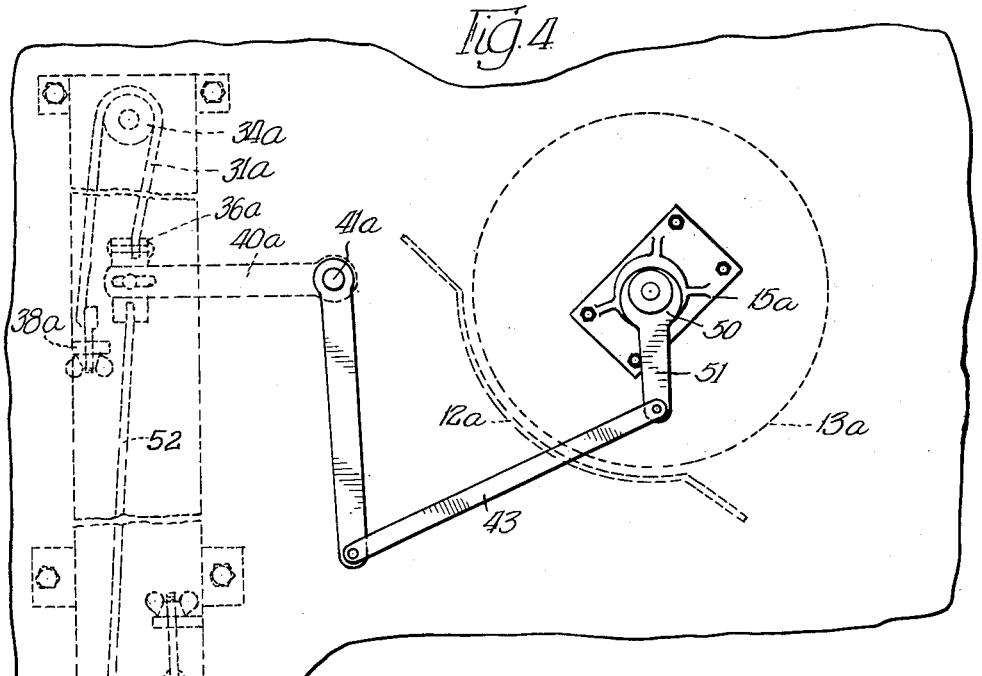
Fig. 4 is a view of a modified embodiment.

A basic principle of this invention is to provide a driven rotary cylinder and a stationary curved plate or concave, one of the two or both being movable automatically or very easily with respect to the other so that the clearance can be adjusted continuously in relation to changes in humidity of the air and the grain. The various arrangements shown in the drawings all disclose machines having fixed concaves and movable cylinders. The principles of the invention, however, are equally applicable where the axis of rotation of the cylinder is fixed and the concave is movable to vary the clearance.

In Figs. 1 and 2 a preferred embodiment of the adjustment apparatus 10 is shown as installed in a threshing machine 11. The concave element 12 is fixed in the machine 11 and has the curved shape shown in Fig. 1 mating with about 90° of the cylinder's circumference and extending the full length of the cylinder 13. In Fig. 2 the concave is not shown, merely to avoid obscuring the cylinder element 13 and associated elements hereinafter described. The cylinder 13 is a conventional threshing cylinder represented in the form of a hollow steel drum having a drive axle 14 whose ends extend slightly beyond the ends of the cylinder 13 and are journalled in a pair of identical movably mounted bearing plates 15. One end of the axle 14 carries a pulley 14a through which the cylinder is driven.

This invention is concerned primarily with the mounting arrangement of the bearing plates 15 and the apparatus for moving them laterally to vary the clearance of the cylinder 13 with respect to the concave 12.

As shown in Figs. 1 and 2, each bearing plate 15 is supported on four bolts or studs 16 which project outwardly from the sides of the machine 11. The four studs 16 are fixed, but they extend through elongated slots 17 provided in the plates 15 so that when the clamping action of the nuts 18 locked on the studs or bolts 16 is released, the plates 15 are freely movable laterally to vary the cylinder clearance. If desired elongated slots for the bolts 16 may be provided in the sides of the machine 11 and round holes provided in the plates 15 so that the bolts 16 move laterally with the plate 15.

To provide for quick releasing of all four studs simultaneously, a wedge member 20 is provided for each bearing plate 15. The construction of this member is best shown in Fig. 3, which shows the shape of the member at one of the studs 16, the contours at the other studs being identical. Each wedge member 20 has four inclined surfaces 21 thereon, the surfaces 21 being disposed so as to coincide with the four stud locations. The bearing plate 15 is provided with a member comprising an upstanding spacer 22 for each stud, and each spacer has an inclined top surface which corresponds with the slope of the surfaces 21 on the member 20.

Each bolt 16 is provided with a washer 23 which lies between the nuts 18 and the wedge member 20 which facilitates the initial tightening of the nuts 18 as when they are tightened down against the member 20 when assembled. Then when the member 20 is moved to the left, as shown in the drawing, the wedging action is relaxed and the downward force exerted on the bearing plate 15 is released so that the plate 15 is readily movable laterally. Conversely, when the wedge member 20 is moved to the right, the wedging action is increased and the plate 15 is securely locked in position.

To effect movement of the wedge plate 20, a threaded rod 24 whose end is rotatably supported in a bracket 25 is provided. Although the whole of this rod is not shown in the drawings it is to be understood that it may be any convenient length so as to extend to a readily accessible position on the machine 11 near the operator. The threaded end of the rod 24 is received in a threaded hole in the end of the wedge member 20 so that rotation of the rod 24 causes longitudinal movement of the member 20. The opposite end of the rod carries a handle 26, much like a conventional vise handle, by which the rod 24 may be rotated. Thus the position of the wedge member 20 may be controlled by the handle 26, and when the handle 26 is rotated one way, the bearing plate 15 will be locked. When it is rotated the other way, the plate 15 will be released for adjustment.

To accomplish movement of the plates 15 automatically when they are loosened, a compensating apparatus 30 employing a piece of leather belting 31 or manila rope as a moisture responsive element is provided. The apparatus 30, in addition to the leather belt 31, comprises an elongated frame 32, a spring 33, sheave 34, and a linkage 35 for transmitting movement from the free end of the belt 31 to the plate 15. Other materials may be employed instead of leather, if desired, provided that they shrink, contract or bend with changes in moisture content. I prefer to employ either leather or manila rope because of the rates at which these materials take up and give off moisture. The rates of these two materials are comparable to those of standing grain so that the proper time lag after humidity changes results. There is an essential difference, however, between the two materials in that the rope contracts with increased moisture, whereas the leather contracts with decrease in moisture content.

The free end of the belt 31 is clamped to a block 36 whose opposite end is attached to the free end of the spring 33, the other end of the spring being secured to an adjustable bracket 37. The other end of the belt 31 is secured to a second adjustable bracket 38 carried by the frame 32, the belt passing over the sheave 34. If desired, additional sheaves may be employed if a shorter frame is desired with a given length of belting, or sheaves can be dispensed with if the support for the loops of belting at one end is carried by the block 36.

The belt 31 is maintained under tension by the spring 33, and the position of the block 36 with respect to the frame 32 will be governed accordingly by the length of the belt. Since leather is quite sensitive to changes in moisture content, any persistent change in the relative humidity of the atmosphere will vary the length of the belt 31 as it takes on or gives up moisture. I have discovered that untreated leather belting has about the same time lag as grain in taking on or giving up moisture to the atmosphere, and, as a result, if the machine has previously stood out in the open for a short period of time, the position of the block 36 gives an accurate measure of the moisture content of the standing grain. If rope is used instead of leather, the position of the moisture responsive element and the spring 33 must be reversed with respect to the direction of movement of the clearance adjustment linkage.

The linkage 35 for transmitting the relative block position to the bearing plates 15 comprises a crank 40 whose free end is pinned to the block 36. The other end of the crank 40 is keyed to a transverse shaft 41 which extends through the machine 11. At each end of the shaft 41 a driven crank 42 is provided. The ends of these cranks are connected directly by rods 43 to the bearing plates 15. Thus, elongation of the leather belt 31 as its moisture content increases relaxes its tension position so that the spring rotates the cranks 42 and 43 in a counterclockwise direction and moves the plates 15 and the cylinder 13 closer to the concave 11, when the handle 26 has been turned to loosen the wedge member 20.

The preferred method of operation of the above described embodiment is as follows: When the thresher is put into operation the first time, the handle 26 is turned to loosen the bearing plates 15. The operator then adjusts the wing nuts 45 and 46 to move the block 36 up or down until the cylinder clearance is deemed to be proper for the stand of grain to be threshed. Markings (not shown) associated with the crank 40 serve as reference points, either as actual clearance indicators or relative positions. The handle 26 is then tightened to lock the plates 15 and threshing begins. If inspection of the grain threshed indicates that the grain is not properly threshed, the wing nuts 45 and 36 may be quickly readjusted to the proper setting by repeating the procedure. Once the cylinder clearance has been adjusted satisfactorily, all that need be done thereafter is to periodically loosen the handle 26 to release the plates and allow the block to reposition itself to reset the clearance to correspond with the then existing moisture condition of the belt and the grain. In this embodiment, however, this must be done at the end of a row or with the machine stopped so that the cylinder will be freely movable to the proper position unaffected by any grain in the clearance space.

According to the desires of the operator, the automatic resetting may be made either periodically during the day, or only at those times when the condition of the threshed grain indicates that resetting is in order. The preferable procedure is to make periodic resettings at one hour intervals, or oftener, during the day, for in that way the human judgment factor is eliminated. When the machine has been put in use and initially adjusted, it is seldom necessary to readjust the clearance the following day if the wedge member 15 is loosened during the night. In some cases it has proved desirable to interengage the wedge member with the power control in such fashion that the bearing plate is locked during the time the cylinder is driven, but is released when the cylinder is at rest so that stopping the machine effects automatic resetting.

The embodiment shown in Fig. 4 is similar to the preferred embodiment in many respects, and, where applicable, like parts bear like numerals in the drawings. The two forms differ, however, in that the modified embodiment gives continuous adjustment of the clearance for moisture content changes without the necessity of releasing clamped bearing plates, and also in that it employs a length of rope which shrinks when wet in place of the spring 33 to maintain the tension on the leather belt.

Instead of movable bearing plates, the modified embodiment 10a employs fixed plates 15a, each having eccentric bushings 50 journalled therein. Each bushing 50 is bored eccentrically to provide a bearing for the cylinder shaft 19a and has an integral arm 51 which projects radially outwardly from the bearing. Rotation of the arms 51 causes lateral shift of the cylinder 13a with respect to the concave 12a to vary the clearance. Because of the eccentric arrangement, very little reaction force is transmitted to the arms 51 from the resistance of the grain being threshed. In the first embodiment this reaction force is absorbed outside the confines of the bearing, whereas in this embodiment the reaction force is controlled within the diameter of the bearing.

The mechanism for controlling the positioning of the arms 51 is quite similar to that of the preferred embodiment except for the substitution of a rope for the spring 33 as noted and the fact that the whole of the compensating apparatus must be constructed somewhat more ruggedly in order to overcome any possible reaction forces or vibration occurring during threshing.

The free end of the leather belt 31a is attached to a block 36a, and the fixed end is adjustable just as in the preferred embodiment. The other side of the block 36a, however, is connected to a length of rope 52 whose opposite end is secured to an adjustable bracket. The length of the rope is such that the product of its moisture coefficient of shrinkage and its length is substantially equal to the moisture coefficient of the belt 31a times its length. Since a rope shrinks as it becomes wet, and a leather belt stretches, the position of the block 36a will vary directly with the moisture content of the rope 52 and belt 31a. I have found that with this arrangement, substantial force is exerted by the block 36a as the relative humidity changes, and, if the lengths of rope and belt are properly chosen, the tension on the assembly can be kept and will remain substantially constant even over a wide range of humidities.

The block 36 is attached to the end of a crank 40a whose other end is connected to a transverse shaft 41a. A pair of crank arms 42a keyed to the ends of this shaft transmit its rotary motion through a pair of links 43a fastened to the ends of the arms 51 on the eccentric bushings 50.

The operation of this embodiment is substantially the same as that of the preferred embodiment except that the moisture correction adjustment is continuously effected once a proper adjustment is made, much the same as would be the case if the wedge plate were to be kept in the released position in the previously described embodiment.

It will be appreciated that the length of the leather belting or the rope will be determined by the length of the arm 40. The clearance adjustment range will be in the neighborhood of not to exceed one-fourth inch with heavy to light grain, and approximately one-eighth inch for humidity changes. Thus, once the length of the arm 40 is determined, the length of the rope or belting can be determined and the number of sheaves required. The longer the rope or belting and the arm, the more sensitive will be the adjustment.

Figure 5:
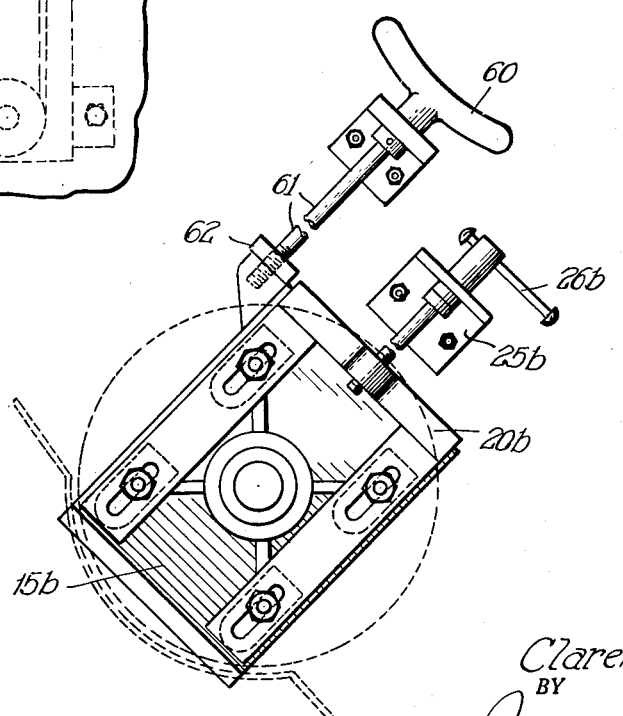
Fig. 5 is a view of another modification having a manual clearance adjustment.

In Fig. 5 a greatly simplified embodiment is illustrated where the moisture correction must be manually made. The bearing plate assembly in this embodiment is substantially the same as that of the preferred embodiment except that a manual handle 60 is provided for adjusting the lateral position of the plate 15b. The handle 60 is attached to a rod 61 whose opposite end is threadably received in a threaded opening provided in a projecting lug 62 integrally formed with the bearing plate 15b. The upper end of the rod 61 is supported for free rotation but against longitudinal movement in a bracket 64 located in an accessible position on the machine.

To adjust the clearance in this embodiment, the operator has merely to twist the handle 26b to retract the wedge member 20b and release the bearing plate 15b. The handle 60 is then turned to move the bearing plate 15b and vary the clearance as desired. When the proper clearance has been established, the wedge plate is again driven downwardly to lock the bearing plates again.

When using this embodiment the preferred procedure is to employ a conventional humidity indicating instrument which will give a ready indication of the relative humidity of the grain. A scale (not shown) is provided at the handle 60 or on the bearing plate, if same is visible, which is graduated in humidity units. Thus all the operator has to do is read the instrument and conform the clearance to the humidity by making the indicated setting on the scale.

Various other modifications of my invention such as the use of rope along in the first described embodiment or the use of other motion transmitting members than those described or the lengthening or shortening of the link for initial adjustment of clearance will present themselves to those familiar with the art. Such changes may of course be made without departing from the spirit of my invention whose scope is commensurate with the following claims:

What is claimed is:

1. In an agricultural implement, the combination including a rotary crop treating cylinder, a cooperating fixed concave, a pair of laterally movable bearing elements supporting the cylinder at both ends and having elongated slots therein, a fixed stud projecting through each of said slots, a wedge member having slots therein corresponding to said first mentioned slots received on said studs adjacent to the bearing element, a plurality of inclined surfaces on said member disposed at each of said second mentioned slots, means for moving said member parallel to said slots to cause said surfaces to wedge against the bearing member and lock the element, and means for moving the element laterally to compensate for moisture variation when the wedge member is moved to a position freeing said element.

2. In an agricultural implement, the combination including a rotary crop treating cylinder, a cooperating fixed concave, a pair of laterally movable bearing elements supporting the cylinder at both ends and having elongated slots therein, a fixed stud projecting through each of said slots having a nut thereon, a wedge member having slots therein corresponding to said first mentioned slots received on said studs intermediate said nuts and the bearing element, a plurality of inclined surfaces on said member disposed at each of said second mentioned slots, means for moving said member parallel to said slots to cause said surfaces to wedge against the nuts and lock the element, and means for moving the element laterally to compensate for moisture variation when the wedge member is moved to a position freeing said element including an adjusting handle located in a readily accessible place remote from said wedge member.

3. In a device of the class described, a bearing support for a rotary cylinder comprising a slidably mounted plate having a plurality of upstanding collars thereon, a bearing carried by said plate, a member having a plurality of inclined surfaces thereon disposed adjacent to said plate and in contact with the tops of the collars with one of said surfaces for each of said collars respectively, means at each of said collars for limiting movement of said member away from said plate, means for moving said member laterally in the direction of rise of said inclined surfaces to lock said plate by wedging said surfaces against said collars including a handle, and means for moving said plate when said plate is not locked by said member to alter the lateral position of said cylinder including a handle, said handles being located in readily accessible places remote from said plate.

4. In a combine having side members, a threshing cylinder and a cooperating concave supported therebetween, said cylinder having a supporting shaft, and said side members having bearing supports for said shaft mounted thereon, said bearing supports each comprising a bearing plate having a shaft bearing therein, each side and each bearing plate having a set of openings therein, one of said sets of openings being in the form of parallel slots, a wedge member having a set of slots in alignment respectively with said openings, and wedge surfaces adjacent to and longitudinally of said slots, spacer members between said bearing plate and said wedge member, a bolt extending through each set of said aligned openings, and adjusting means operatively interconnecting said bearing plate and said wedge members to said side member, whereby movement of said wedge member will lock said bearing plate to said side member.

5. In a combine having side members, a threshing cylinder and a cooperating concave disposed therebetween, said cylinder having a shaft, a support for said concave mounted on said side members, a bearing support for said shaft mounted on said side members to support the cylinder in operating position with respect to the concave, one of said supports comprising a movable plate member mounted on each side member for relative movement of the concave and cylinder towards and away from each other, one of said members having a set of openings therein elongated in the direction of relative movement between said concave and cylinder, elongated elements carried by the other of said members one extending through each opening and having a terminal enlargement forming a shoulder facing said plate, wedge elements disposed beneath said shoulders having slots receiving said elongated elements, said slots being elongated transversely to said elongated elements in a direction determining the direction of movement between the wedge elements and said elongated elements, wedge surfaces on said wedge elements adjacent to and disposed longitudinally of said slots, spacer members between said plate member and said wedge elements, means operatively interconnecting the side member and said plate member for adjusting the cylinder and concave member clearance, and means operatively interconnecting the side member and said wedge elements for moving said wedge elements simultaneously as a unit transversely to said elongated elements whereby movement thereof will lock said plate member to said side member.

6. In a combine having side members, a threshing cylinder and a cooperating concave disposed therebetween, said cylinder having a shaft, means for supporting the concave on the side members, bearing means journalling the shaft upon the side members in operating position with respect to the concave, one of said means including a plate member movably mounted on each side member for relative adjustment of said concave and cylinder towards and away from each other, one of said members having a set of openings elongated in the direction of relative movement between each plate member and side member, elongated elements carried by each side member one extending through each opening and having a terminal enlargement forming a shoulder facing the respective plate member, wedge elements disposed beneath said shoulders having slots receiving said elongated elements, said slots being elongated transversely to said elongated elements in a direction determining the direction of movement between the wedge elements and said elongated elements, wedge surfaces on said wedge elements adjacent to and disposed longitudinally of said slots, spacer members between said plate member and said wedge elements, means operatively interconnecting the side members with their respective plate members for adjusting the clearance between the cylinder and the concave, and means operatively interconnecting each side member and wedge elements for moving said wedge elements simultaneously as a unit transversely to said elongated elements whereby movement thereof will lock said plate members to said side members.

7. The combination called for in claim 6 in which said means operatively interconnecting the side members with their respective plate members includes a moisture responsive element for adjusting the clearance between the cylinder and the concave in response to persistent humidity changes when said plate members are unlocked.

8. The combination called for in claim 6 in which said means operatively interconnecting the side members with their respective plate members includes an elongated moisture responsive element exposed to the atmosphere and having one end fastened to a side member and the other end free, and a linkage for transmitting motion of said free end to said plate member.

9. The combination called for in claim 6 in which said means operatively interconnecting said side member and wedge elements includes a handle located in a readily accessible place remote from the plate member and wedge elements.

10. The combination called for in claim 6 in which the means operatively interconnecting the side members with their respective plate members includes a moisture responsive element, and a resilient element opposing said moisture responsive element to urge the plate members to the limit of their movement permitted by said moisture responsive element when said plate members are unlocked.

11. The combination called for in claim 1 in which the last means enumerated comprises a leather belt arranged to urge to move said element laterally in a direction of separating said cylinder and concave.

References Cited in the file of this patent

UNITED STATES PATENTS

| Number | Name | Date |
|---|---|---|
| 512,392 | Phelan | Jan. 9, 1894 |
| 567,117 | Campbell | Sept. 1, 1896 |
| 1,049,810 | Cryder | Jan. 7, 1913 |
| 1,676,292 | Schwemlein | July 10, 1928 |
| 1,987,726 | Wilkerson | Jan. 15, 1935 |
| 2,310,282 | Gauss | Feb. 9, 1943 |
| 2,318,188 | Anderson et al. | May 4, 1943 |
| 2,334,944 | Millard et al. | Nov. 23, 1943 |
| 2,376,618 | Paradise et al. | May 22, 1945 |
| 2,425,943 | Krause | Aug. 19, 1947 |

FOREIGN PATENTS

| Number | Country | Date |
|---|---|---|
| 514,933 | Great Britain | Nov. 21, 1939 |